(12) United States Patent
Sauder et al.

(10) Patent No.: US 7,631,606 B2
(45) Date of Patent: Dec. 15, 2009

(54) SEED BELT FOR AN AGRICULTURAL PLANTER

(75) Inventors: Gregg A. Sauder, Tremont, IL (US); Derek A. Sauder, Tremont, IL (US); Brad A. Wiegand, Mackinaw, IL (US)

(73) Assignee: Precision Planting, Inc., Tremont, IL (US)

( * ) Notice: Subject to any disclaimer, the term of this patent is extended or adjusted under 35 U.S.C. 154(b) by 171 days.

(21) Appl. No.: 11/207,296

(22) Filed: Aug. 19, 2005

(65) Prior Publication Data
US 2007/0039528 A1    Feb. 22, 2007

(51) Int. Cl.
A01C 7/00    (2006.01)
A01C 9/00    (2006.01)
B65G 17/04    (2006.01)
B65G 17/32    (2006.01)
B65G 17/36    (2006.01)

(52) U.S. Cl. .................. 111/171; 198/711; 198/715

(58) Field of Classification Search ................ 198/711, 198/715; 111/170, 171, 177
See application file for complete search history.

(56) References Cited

U.S. PATENT DOCUMENTS

| 463,178 | A | * | 11/1891 | Vanderburg | 198/711 |
|---|---|---|---|---|---|
| 507,126 | A | * | 10/1893 | Hewes | 198/711 |
| 567,469 | A | * | 9/1896 | Griscom | 198/711 |
| 697,874 | A | * | 4/1902 | Oldham | 198/711 |
| 2,916,136 | A | * | 12/1959 | Combs | 198/711 |
| 3,077,290 | A | | 2/1963 | Rehder | |
| 3,176,636 | A | | 4/1965 | Wilcox et al. | |
| 3,197,018 | A | * | 7/1965 | Kayser | 198/711 |
| 3,413,941 | A | | 12/1968 | Roberson | |
| 3,552,601 | A | | 1/1971 | Cordova | |
| 3,627,050 | A | | 12/1971 | Cordova | |
| 4,023,509 | A | | 5/1977 | Hanson | |
| 6,269,758 | B1 | | 8/2001 | Sauder | |
| 6,681,706 | B2 | | 1/2004 | Sauder et al. | |
| 6,729,249 | B2 | | 5/2004 | Sauder et al. | |

FOREIGN PATENT DOCUMENTS

EP    0186772 A1 * 11/1985

* cited by examiner

Primary Examiner—Christopher J. Novosad
(74) Attorney, Agent, or Firm—Larkin Hoffman Daly & Lindgren Ltd.; Thomas J. Oppold

(57) ABSTRACT

A seed belt for an agricultural planter wherein the seed belt includes a continuous belt with a plurality of substantially equally spaced flights. Each of the flights having a concave portion at a distal end.

14 Claims, 7 Drawing Sheets

SEED BELT FOR AN AGRICULTURAL PLANTER

BACKGROUND OF THE INVENTION

It is well recognized that proper and uniform spacing of seed in the furrow is essential to maximizing crop yield. Recent advances in metering technology have resulted in seed meters capable of singulating seed extremely well in field planting conditions. However, once the seed is dispensed from the seed meter, various factors can operate on the seed which can effect the ultimate spacing of the seed in the furrow. One such "post-seed-discharge" factor effecting seed spacing in the furrow is the manner in which sequentially released seeds travel through the seed tube.

It has been found that once seeds are dispensed into the seed tube, sequentially released seeds may travel through the seed tube at different rates depending on the amount and type of contact the seeds have with the sidewalls of the seed tube. In some instances, a later sequentially dispensed seed may even pass a previously dispensed seed in the seed tube. For example, some seeds may quickly pass through the seed tube by free-fall substantially the entire length of the seed tube, only making brief contact or sliding contact with the forward curved wall of the seed tube before exiting the seed tube. Other seeds may pass more slowly through the seed tube by sliding along the curved forward wall of the seed tube substantially the entire length of the seed tube. Still other seeds may pass even more slowly through the seed tube as a result of bouncing and ricocheting off the walls of the seed tube substantially the whole length of the seed tube.

Several factors contribute to seeds experiencing different amounts and types of contact with the walls of the seed tube, thereby effecting seed spacing in the furrow. For example, as an agricultural planter traverses a field, surface irregularities in the field lead to momentary jostling, vibration or other positional shifting of the planter components, including the seed tubes. The desire to plant at ever increasing ground speeds compounds, these post-seed-discharge factors effecting accuracy and uniformity of seed spacing in the furrow.

With tests using high speed cameras, it was found that the amount of contact with the side walls of the seed tube that a seed experiences while traveling through the seed tube is greatly effected by the manner and position in which the seed enters the seed tube. The high speed camera footage revealed that if the seeds are dispensed to either side of the centerline of the seed tube, the seeds contact the side walls of the seed tube more frequently, than if the seeds are dispensed directly into the center of the tube. As previously discussed, it is important that all seeds pass through the seed tube at the same rate in order for the seed spacing to be maintained in the furrow corresponding to the seed discharge rate from the seed meter.

While the high speed camera footage simply confirms what seems a logical conclusion, no one has heretofore conceived of a means for accurately and consistently delivering and releasing seeds into the seed tube near its vertical centerline. The foregoing problem of delivering seed into the seed tube near its vertical centerline is a particular problem with planters using finger-type seed meters. Finger-type seed meters have been used on agricultural planters since the early 1970s, and continue to be the most widely used type of seed meter on planters in use today.

The overall structure and function of the finger-type seed meter has changed little from the original patented design disclosed in U.S. Pat. No. 3,552,601 to Hansen et al. (hereinafter "Hansen '601"). Improvements to certain components of the finger-type meter which improve the operation of the finger-pickup meter are disclosed in U.S. Pat. No. 6,269,758 to Sauder et al. and U.S. Pat. No. 6,729,249 to Sauder et al (hereinafter "Sauder '758" and "Sauder '249", respectively).

Referring to FIGS. 1, 2 and 3 a conventional finger-type seed meter 30 as disclosed in Hansen '601, Sauder '758 or Sauder '249 is illustrated. The seed meter 30 cooperates with a seed belt housing assembly 34, which receives the seeds being sequentially discharged from the seed meter 30, and separately conveys the singulated seeds toward the seed tube 36 into which the seeds are released. While the seed belt housing assembly 34 serves its intended purpose of sequentially receiving seeds from the seed meter for release into the seed tube 36, the flighted seed belt 96 of the seed belt housing assembly 34 does not consistently dispense the seeds near the vertical axis of the seed tube 36. One of the reasons for the inconsistency is that the flight 97 of the seed belt 96 is typically approximately one inch in width, while the largest seeds typically planted with finger-type meters are corn or sunflower seeds with their largest dimension generally not exceeding $\frac{3}{8}$ inch. Due to the disparity in the width of the flight 97 versus the seed, the position of the seed on the flight can vary nearly one inch. Thus, the area over which sequential seeds may enter the seed tube may vary by nearly an inch, or nearly $\frac{1}{2}$ inch laterally on either side of the vertical centerline of the seed tube. As a result, the structure of the seed belt 96 as found in conventional seed belt housings 34, actually contributes to inaccurate seed spacing in the furrow.

Thus, there is a need in the agricultural industry for a seed belt which can replace the seed belts used with conventional seed belt housings but which overcomes the deficiencies associated with conventional seed belts. Similarly, there is a need for seed belts for use in any application where it is desired to accurately and consistently dispense seeds, whether into a seed tube or directly into a seed furrow.

SUMMARY OF THE INVENTION

The present invention is directed toward a seed belt for an agricultural planter. The seed belt includes a continuous belt with a plurality of substantially equally spaced flights projecting from an upper surface thereof, each of the flights having a concave portion at a distal end. In the preferred embodiment, the flights further include a substantially planar portion at a proximal end. The distal end of the flight is preferably disposed with respect to the proximal end in a direction toward an intended direction of travel of the seed belt. Preferably, the distal end further includes an upper surface angled with respect to the proximal end, such that the upper surface of the distal end is substantially normal to the continuous belt upper surface. Side edges of the distal end of the flight preferably angle upwardly with respect to the distal end upper surface thereby defining the concave portion. The concave portion of the distal end of the flight preferably includes a central portion disposed between the angled side edges, with the central portion being preferably substantially planar with a width that is of a dimension at least as large as the seeds to be conveyed by the seed belt when in use.

BRIEF DESCRIPTION OF THE DRAWINGS

The embodiment of the seed belt of the present invention as shown in the following drawings, are illustrative only, and it should be understood that changes may be made in the specific form illustrated and described without materially departing from the teachings herein.

DETAILED DESCRIPTION OF THE INVENTION

Figure 1:
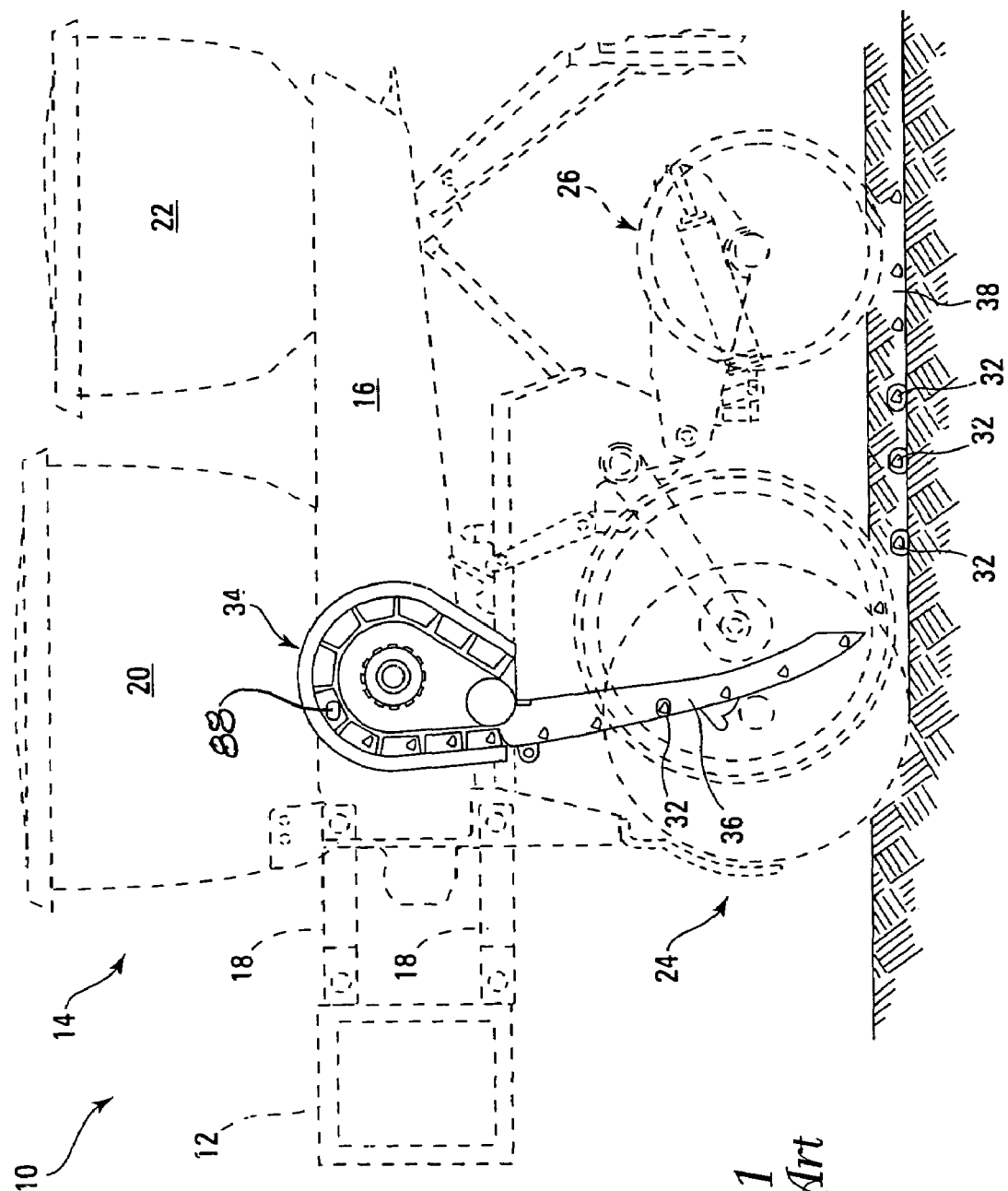
FIG. 1 is a side elevation view of a conventional agricultural planter showing the seed belt housing dispensing the singulated seeds received from a seed meter into the seed delivery tube.

Drawing FIG. 1 shows part of a typical agricultural planter 10, such as a John Deere 7000 and 7100 series planter, as disclosed in U.S. Pat. No. 4,009,668 issued to Brass et al., which is hereby incorporated by reference. As is conventional, the planter 10 includes a mobile main frame 12, only a portion of which is illustrated in FIG. 1. The main frame 12 is conventionally attached to and towed by a tractor (not shown). The planter 10 comprises a plurality of individual row units 14 (only one of which is shown) spaced substantially evenly along the main frame 12. Each row unit 14 includes a row unit frame 16, vertically adjustable relative to the main frame 12 by a parallel linkage 18. The row unit frame 16 of each row unit 14 typically supports a seed hopper 20, a fertilizer hopper 22, a furrow opening assembly 24 and a furrow closing assembly 26. Additionally, each row unit frame 16 supports a seed metering device 30, which selects and dispenses individual seeds 32 at regular intervals. The dispensed seeds 32 are guided to the ground surface by a seed tube 36 for release into a seed furrow 38 formed by the furrow opening assembly 24. The deposited seeds in the seed furrow are then covered with soil by the furrow closing assembly.

There are various type of commercially available seed meters 30. The John Deere 7000 and 7100 series planters previously referred to, for example, utilize finger-type or "finger-pickup" seed meters as previously discussed and as disclosed in U.S. Pat. No. 3,552,601 to Hansen et al., and in U.S. Pat. Nos. 6,269,758 and 6,729,249 to Sauder et al, each of which are hereby incorporated herein by reference.

Figure 2:
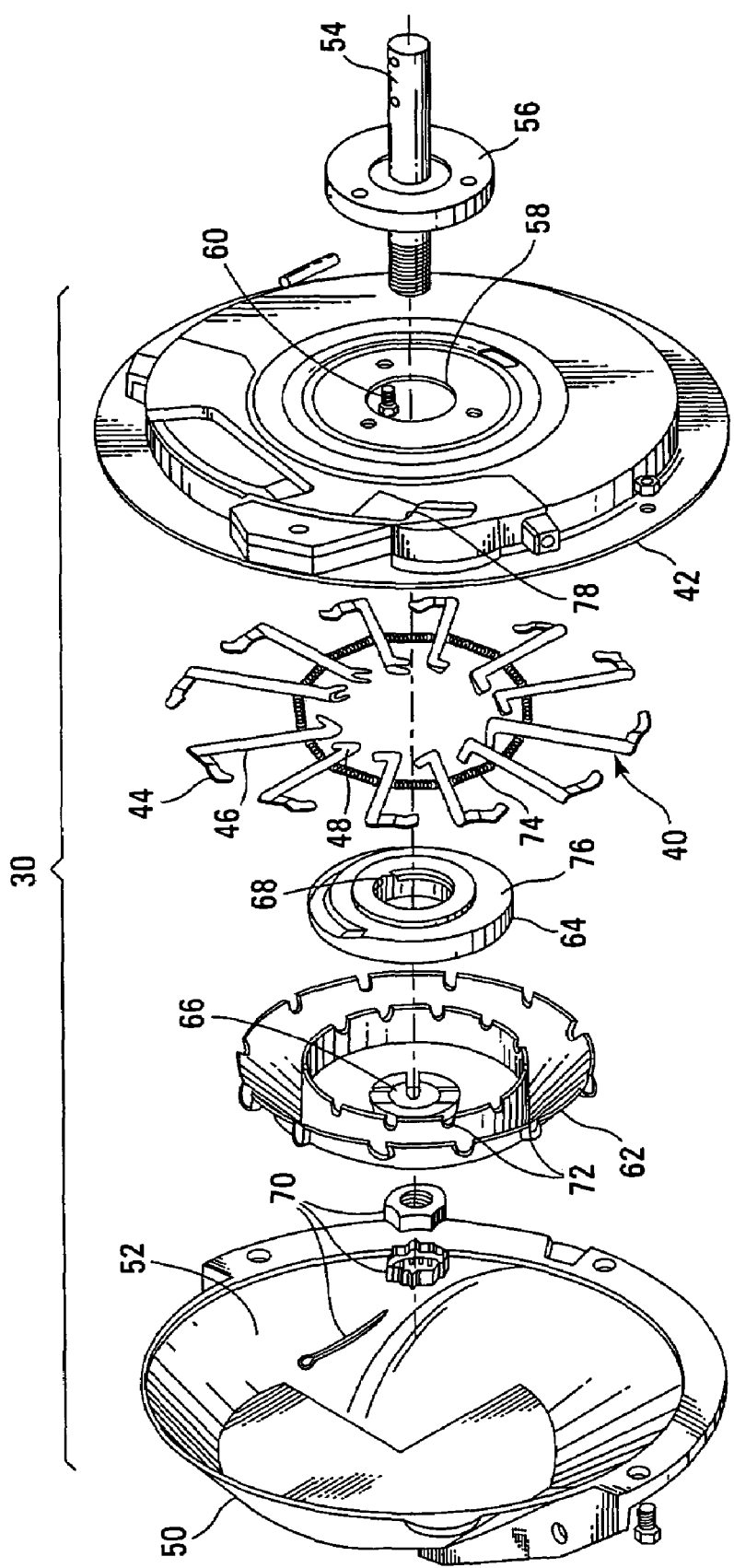
FIG. 2 is an exploded perspective view of a conventional finger-pickup meter.

Drawing FIG. 2 is an exploded perspective view of a typical finger-pickup meter 30 as disclosed in Hansen '601 and Sauder '758 and/or Sauder '249. The finger-pickup meter 30 includes a seed selection mechanism in the form of a plurality of spring biased seed selecting fingers 40 which are mounted adjacent a stationary backing plate or wear plate 42 supported by the row unit frame 16. Each finger 40 has a seed engaging portion 44, an elongated cylindrical portion 46, and a cam follower portion 48. A cover 50, attaches to the backing plate 42 to enclose the seed selecting fingers 40 and to form a seed supply reservoir 52. The seeds in the seed supply reservoir 52 are received from the seed hopper 20 (FIG. 1) through a boot (not shown).

A rotatable shaft 54 disposed within a bearing hub 56 extends through a central bore 58 in the backing plate 42. The bearing hub 56 mounts to the backing plate 42 with fasteners 60 as shown. The meter 30 further includes a rotatable finger guide 62 and a stationary cam member 64 each having a central bore 66, 68 respectively, to receive the rotatable shaft 54.

The rotatable finger guide 62 is formed in the shape of a conical frustum and receives the stationary cam member 64. The finger guide 62 is secured to the rotatable shaft 54 such as by a nut, locking cap and cotter pin, designated generally at 70, such that the shaft 54 and finger guide 62 rotate together. The cam member 64 disposed within the finger guide 62, is restrained by the backing plate 42 and does not rotate. The finger guide 62 includes a plurality of radial recesses 72 which receive the elongated cylindrical portion 46 of the fingers 40. The finger guide 62 in cooperation with the plurality of springs 74 secured to the fingers 40 biases the seed engaging portion 44 of the fingers against the backing plate 42. Thus, it should be appreciated that as the finger guide 62 rotates with the shaft 54, the spring biased fingers 40 rotate about the stationary cam member 64.

The cam member 64 includes a beveled cam face 76 that is engaged by the cam followers 48 as the fingers 40 rotate. As the spring biased fingers 40 rotate over the beveled portion of the cam face 76, the seed engaging portion 44 of the fingers 40 are forced away from the backing plate 42. This beveled portion on the cam face 76 is disposed such that the seed engaging portion 44 of the fingers 40 are in the raised position as the fingers rotate through the seed reservoir 52 to allow the fingers 40 to capture a seed. As the cam followers 48 pass the beveled portion of the cam face 76, the biasing force of the springs 74 forces the finger 40 back against the backing plate 42, thus securely holding the seed between the seed engaging portion 44 and the backing plate 42. As the fingers 40 continue to rotate, the seed is slid along the backing plate 42 toward the seed discharge opening 78, through which the seeds are then forcibly ejected by the spring biased fingers 40.

Figure 3:
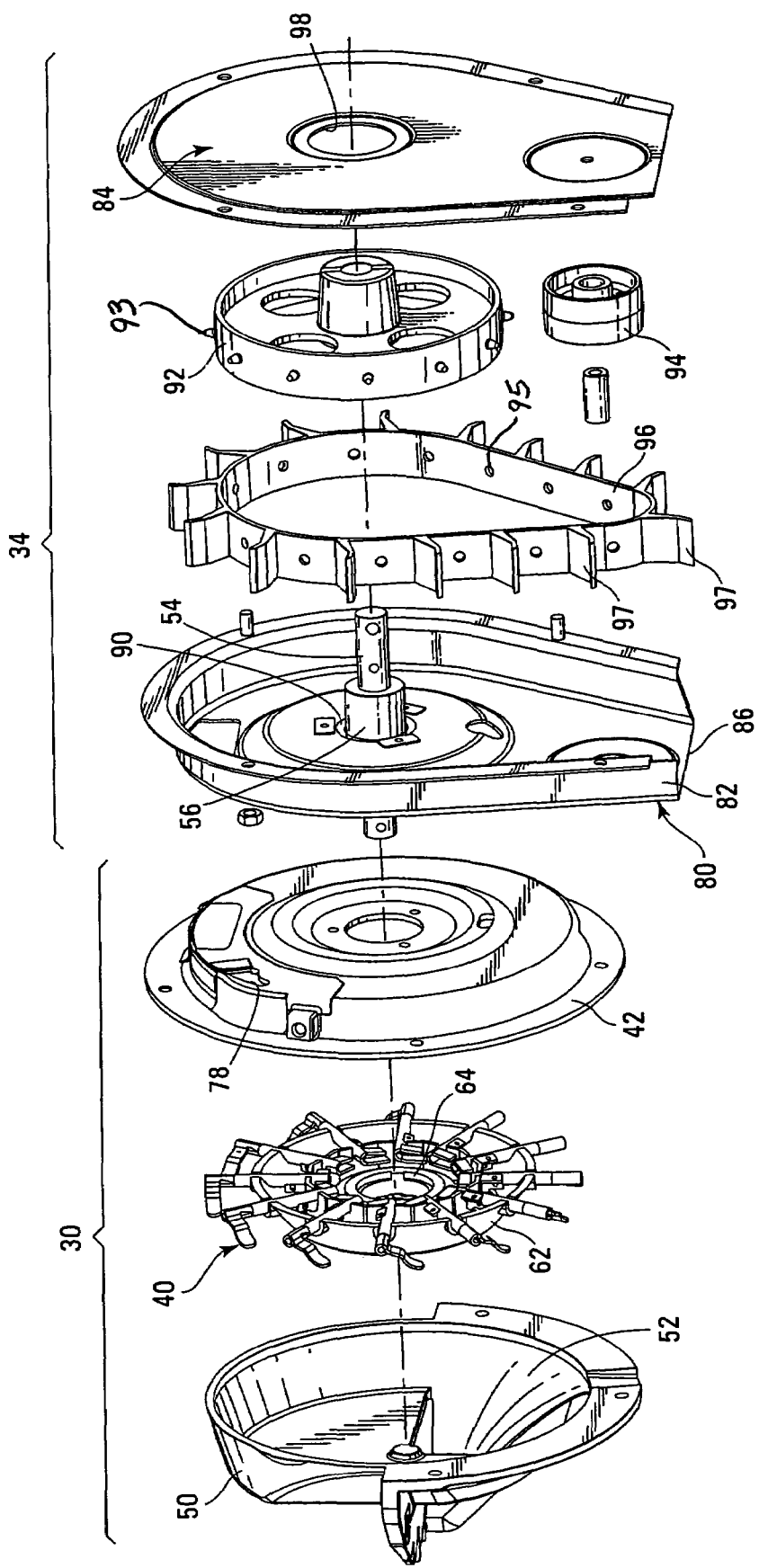
FIG. 3 is a perspective view of the partially assembled finger-pickup meter of FIG. 2 and an exploded perspective view of a conventional seed belt housing assembly.

Referring now to FIG. 3, the finger-pickup meter 30 is shown partially assembled along with the adjacently disposed conventional seed belt housing 34, such as that disclosed in the John Deere 7000 and 7100 series MaxEmerge® Planting Units and Attachments Parts Catalog, which is incorporated herein by reference. The seed belt housing 34 is comprised of a front panel 80 having a flanged wall 82 extending about its entire periphery except at the lower end which is open. A substantially planar back panel 84 is secured by fasteners to the flanges of the peripheral wall 82, thereby forming an enclosure with an opening at a bottom end 86. The front panel 80 is disposed adjacent the backing plate 42 of the seed meter 30 and is mounted to the hub 56. The front panel 80 includes a seed receiving opening 88 (FIG. 1) aligned with the seed discharge opening 78 of the seed meter 30 through which the singulated seeds 32 enter the seed belt housing 34. The front panel 80 further includes an aperture 90 for receiving the shaft 54.

A drive pulley 92 is secured to the shaft 54 for rotation therewith. An idler pulley 94 is rotatably secured between the front and back panels 80, 84 as shown. A flexible conveyor belt 96 is trained over the drive pulley 92 and idler pulley 94. Circumferentially spaced pegs 93 project from the circumferential surface of the drive pulley 92. These pegs 93 engage spaced apertures 95 in the conveyor belt 96 to thereby provide a more positive connection with the belt 96 as opposed to simply relying on friction to drive the belt 96. The conveyor belt 96 further includes a plurality of spaced apart, outwardly projecting flights 97 which form a plurality of spaced compartments defined by leading and trailing flights 97 which keep the sequentially discharged seeds separated while being conveyed for release into the seed tube 36 as shown in FIG. 1. In FIG. 1, the seed meter 30 is disposed behind the seed belt housing 34 and is therefore not visible.

The shaft 54 extends through an aperture 98 in the back panel 84. Typically, a sprocket 99 is secured to the end of the shaft 54. A drive chain (not shown) is trained over the sprocket 99 and a second sprocket (not shown) secured to a drive shaft (not shown) coupled to the ground engaging wheels of the planter.

In operation, as the ground engaging wheels rotate, the drive shaft coupled thereto is driven which causes the rotation of the shaft 54 by the drive chain. The rotation of the shaft 54 in turn causes the drive pulley 92 to turn the conveyor belt 96 within the seed belt housing assembly 34. The spring biased fingers 40 within the seed meter assembly 30, which are also coupled to the shaft 54, are also caused to rotate. The as the spring biased fingers 40 rotate through the seed reservoir 52 (FIG. 2) the fingers capture seeds against the backing plate 42. As the fingers continue to rotate, the captured seeds are slid along the backing plate 42 until being forcibly ejected by the spring biased fingers 40 through the seed discharge opening 78.

The ejected seeds enter the seed belt housing 34 through the opening 88 in the front panel 80 of the seed belt housing 34. Ideally, the individual seeds 32 are received separately in the compartments between the leading and trailing flights 97 of the rotating conveyor belt 96. The separated seeds are conveyed downwardly until being released through the opening at the lower end 86 of the housing 34 into the seed tube 36 as shown in FIG. 1.

Figure 4:
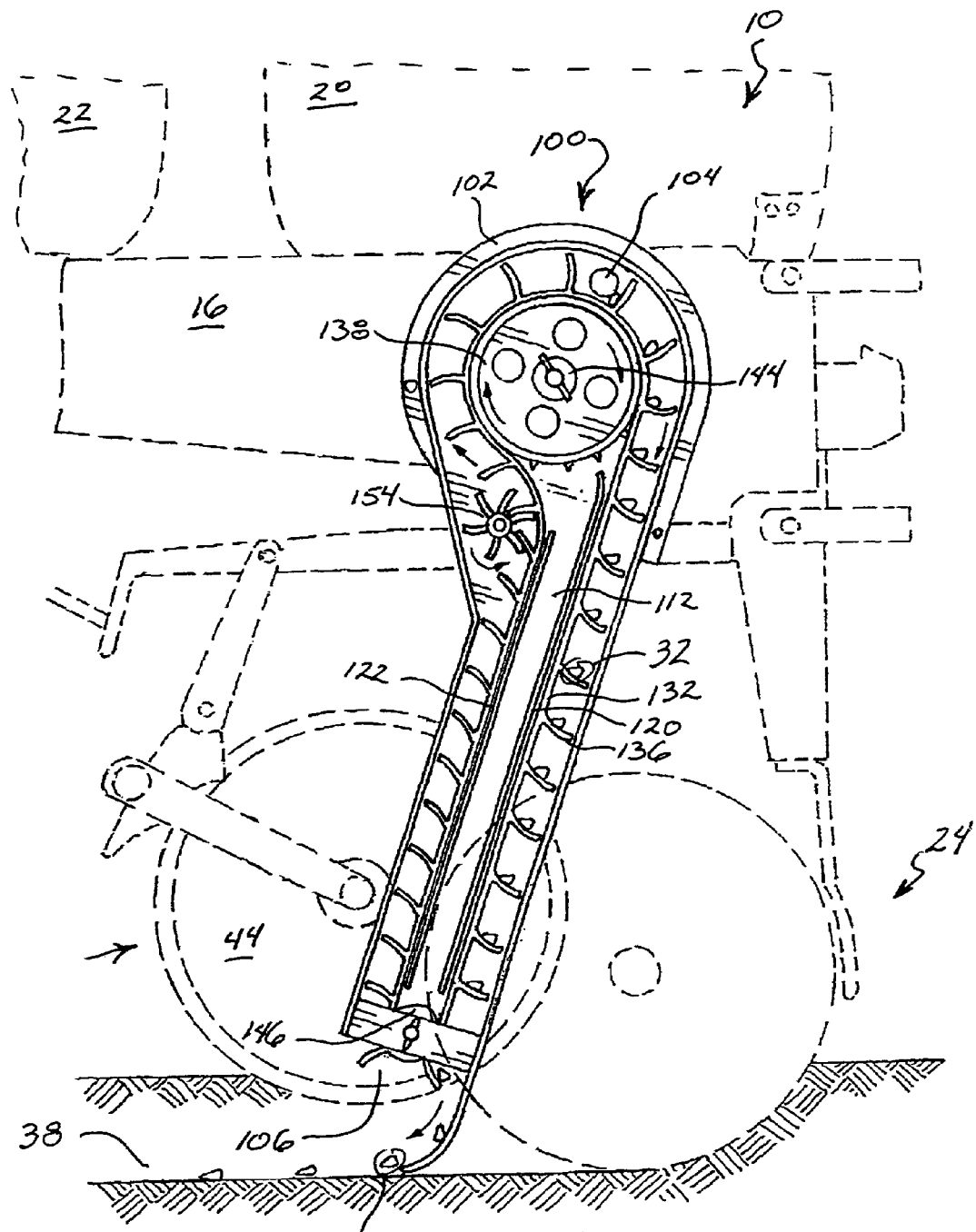
FIG. 4 is a side elevation view of a prior art seed delivery apparatus adapted to replace the seed belt housing and seed tube of the conventional planter of FIG. 1, for example.
Figure 5:
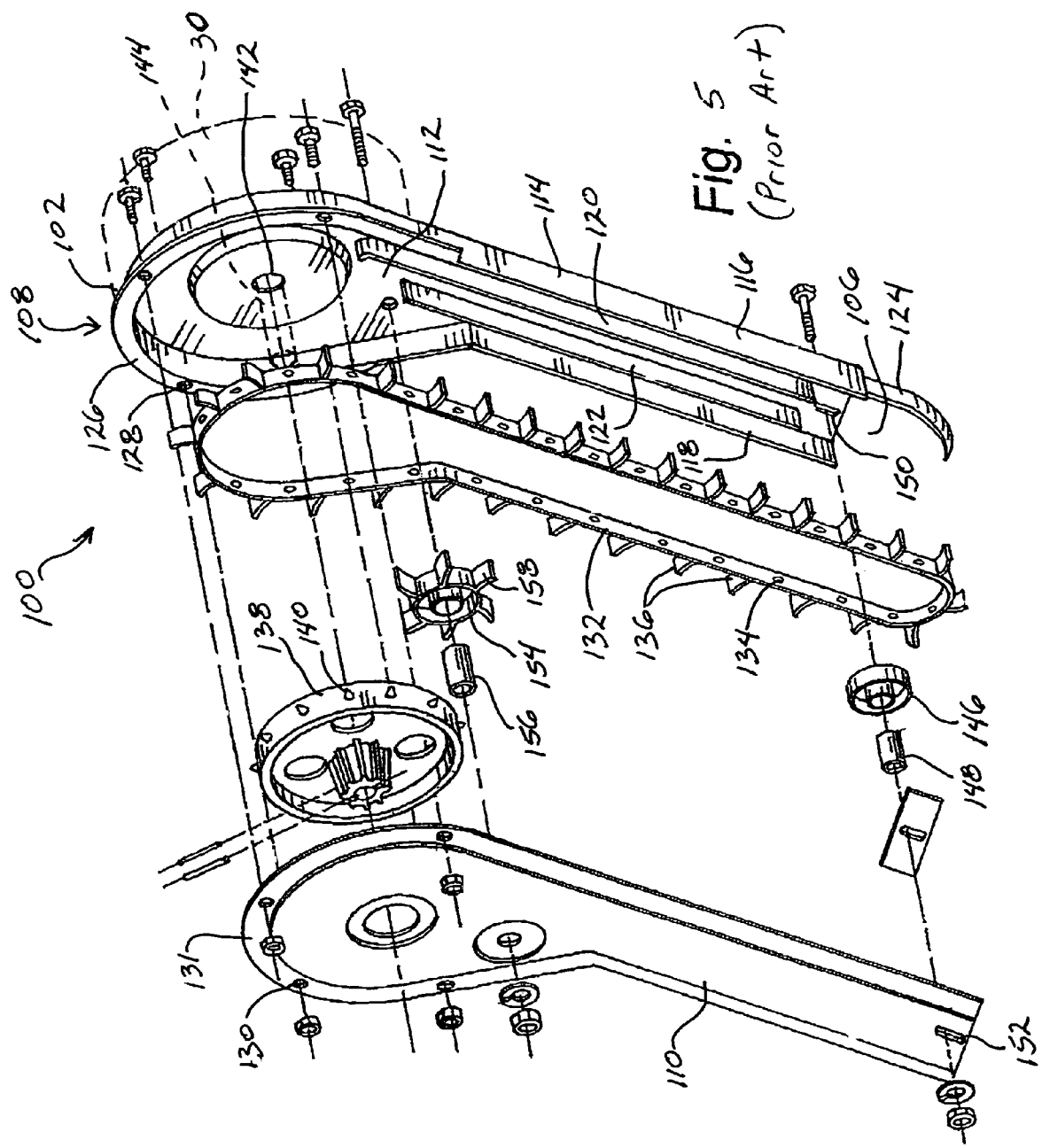
FIG. 5 is an exploded perspective view of the seed delivery apparatus of FIG. 4.

FIGS. 4 and 5 illustrates another prior art seed delivery apparatus 100 such as that disclosed in U.S. Pat. No. 6,681,706 to Sauder et al., which is hereby incorporated by reference. The seed delivery apparatus 100, replaces the seed tube and seed belt housing of a conventional agricultural planter such as that shown in FIGS. 1-3. The embodiment of the seed delivery apparatus 100 of FIGS. 4 and 5 is similar to the conventional seed belt housing assembly 34, except that the housing and belt are elongated and additional flights have been added for conveying the seeds from the point of discharge from the seed meter 30 all the way toward the ground surface before being released into the open furrow.

The seed delivery apparatus 100 is preferably operably supported by the planter's row unit frame 16. Generally, the seed delivery apparatus 100 comprises a conveyor support structure and a seed conveyor mounted movably relative to the conveyor support structure. In operation, the seed from the seed meter 24 enters the conveyor support structure at an upper end 102 through a seed receiving opening 104. The seed conveyor then conveys the seeds 25 downwardly toward a lower end 106, opened to allow dispensing of the seeds 32 into the furrow 38.

The preferred conveyor support structure includes a housing 108 that substantially encloses the seed conveyor. The housing 108 includes a substantially flat panel 110, and opposite panel 112 and a housing perimeter wall 1 14 perpendicular to the panels 110, 112. The housing perimeter wall 114 and the panel 112 preferably form a unitary member of the housing 108 as shown. The housing 108 incorporates a lower, elongate region along which opposite segments 116 and 118 of housing wall 114 are parallel to one another. Elongate belt guides 120 and 122 are disposed inside the housing 108 along the lower region, and run parallel to the opposed housing wall segments 116, 118. A seed guide 124 preferably extends downwardly from housing wall segment 116.

A flange 126 extends outwardly from the upper region of housing wall 114. Openings 128 through flange 126, and corresponding openings 130 through an outer circumferential portion 131 of panel 110, accommodate nut-and-bolt fasteners used to removably secure the panels 110, 112 and housing wall 114 together and thus form the substantially enclosed housing 108. The upper portion of the housing 108 is preferably enlarged to facilitate a coupling of the seed delivery apparatus 100 to the seed meter 24. The coupling is preferably releasable, such as by a bolted connection, enabling a retrofitting of the row unit 14 by attaching the seed delivery apparatus 100 in lieu of the prior art seed delivery structure incorporating the flighted seed belt housing assembly 34 and seed tube 36 illustrated in FIGS. 1-3.

The seed conveyor comprises a continuous belt 132. A series of uniformly spaced apart apertures 134 are formed through the belt 132. A series of flights 136 extend outwardly from the belt 132, spaced apart from one another, by substantially the same distance. The seed delivery apparatus 100 further includes a plurality of pulleys to move and shape the belt 132, including a drive pulley 138. A plurality of studs 140 are preferably arranged circumferentially about the drive pulley 138, uniformly spaced apart from one another the same distance as apertures 134 of the belt 132. An opening 142 is provided through panel 112, for receiving a drive mechanism, such as a drive shaft 144, which also preferably drives the seed meter 30. In most conventional planters, the seed meter 30 is driven by a shaft that is coupled to a sprocket and chain assembly that may be either ground driven or driven independently of the ground speed of the planter. Thus, the drive shaft 144 for rotating the drive pulley 138 may simply be an extension of the same shaft used to drive the seed meter 30. The drive pulley 138 is operably removably coupled to the drive shaft 144 by any well known means, such as a key and pin arrangement, thereby providing rotational speed of the drive pulley 138 matched to the rotational speed of the seed meter 30.

At the lower end 106 of the seed delivery apparatus 100, the belt 132 is trained about an idler pulley 146, rotatable about a sleeve 148 and secured between panels 110 and 112 by removable fasteners extending through elongated apertures 150 and 152 through panels 110 and 112, to permit tension adjustment of the belt 132. A tabbed idler pulley 154 is mounted rotatable on a sleeve 156 between the panels 110, 112. The tabbed idler pulley 154 biases the belt 132 inwardly, providing a more secure wrapping engagement of the belt 132 around the drive pulley 138. The tabbed idler pulley 154 has a plurality of outwardly extending tabs 158, spaced apart from one another to positively interact with flighted belt 132.

The idler pulleys 146 and 154 cooperate to maintain the flighted belt 132 about drive pulley 138 in a driving engagement with the studs 140 of the pulley extending into the apertures 134 of the belt 132. As shown in FIG. 4, with the panel 112 removed, it is readily apparent that adjacent pairs of flights 136 cooperate with the belt 132 to form compartments, each compartment designed to carry a single seed from the seed receiving opening 104, downwardly to the open lower end 106 of the housing 108, where travel of each flight away from housing wall 114 releases the seed at a point near the top of the furrow 38. As the belt 132 continues to move, the forward flight 136 of each compartment supports its associated seed, so that the seeds descend at the controlled conveyor speed. The belt guides 120 and 122 act upon the belt near the housing wall segments 116 and 118 to stabilize the belt along these segments. These guides 120, 122 further prevent oscillations in the endless belt that might carry the belt inwardly away from the housing wall 114, thus tending to maintain the compartments substantially closed. In this manner, the belt guide 120 prevents each seed from slipping downwardly into the next adjacent compartment on its way to the point of release.

As perhaps best illustrated in FIG. 5, the flights 136 and the belt 132 have a width substantially equal to but less than the width of the housing wall 114. Accordingly, although the flighted belt 132 moves freely within the housing 108, the space between each panel 110, 112 and the flighted belt 132 is sufficiently narrow to prevent the escape of any seed from its compartment, until the intended point of release where movement of the belt 132 around the idler pulley 146 draws each flight 136 away from the housing wall 114. Each seed, during its descent beyond the point of release, preferably encounters the seed guide 124 and is thereby gently directed to the bottom of the furrow 38.

As previously noted, the same mechanism that operably drives the seed meter 30 also preferably rotates the drive pulley 138. Accordingly, the belt 132 is driven at a conveyor speed synchronized to the seed meter speed, to ensure that as the seed meter 30 discharges seeds individually and in a sequence, the seeds are received sequentially into each of the moving compartments.

Figure 6:
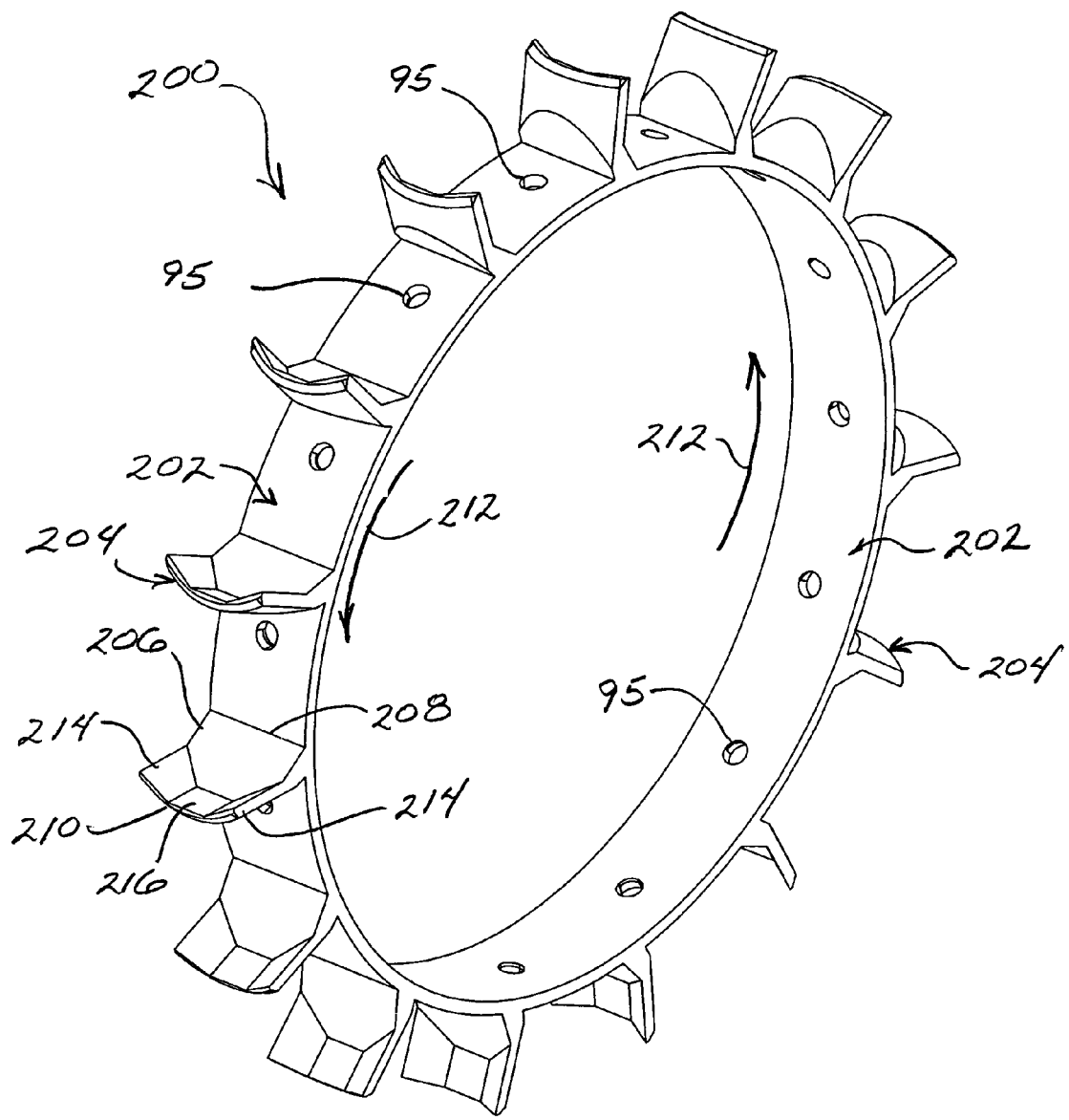
FIG. 6 is a perspective view of a preferred embodiment of the seed belt of the present invention for use in replacing a conventional seed belt as illustrated in FIG. 3, for example.

Referring now to FIG. 6, an embodiment of a seed belt 200 of the present invention is illustrated. In this embodiment, the seed belt 200 is illustrated as a flighted belt intended to replace the seed belt 96 used in conventional seed belt housings 34 as illustrated in FIGS. 1-3. As such, the seed belt 200 preferably has substantially the same flexibilty and other properties as the flighted belts 96 used in convention seed belt housings 34. Furthermore, if elongated and more flights added, the seed belt 200 may be used in place of the seed belt 102 in the seed delivery apparatus 100 of FIGS. 4 and 5. Thus, although the embodiment of the seed belt 200 of FIG. 6 is illustrated as being particularly adapted for use in replacing seed belts in conventional seed belt housings, it should be appreciated that the seed belt 200 may be used in any application wherein it is desired to convey and release seeds or other objects within a precise area.

Figure 7:
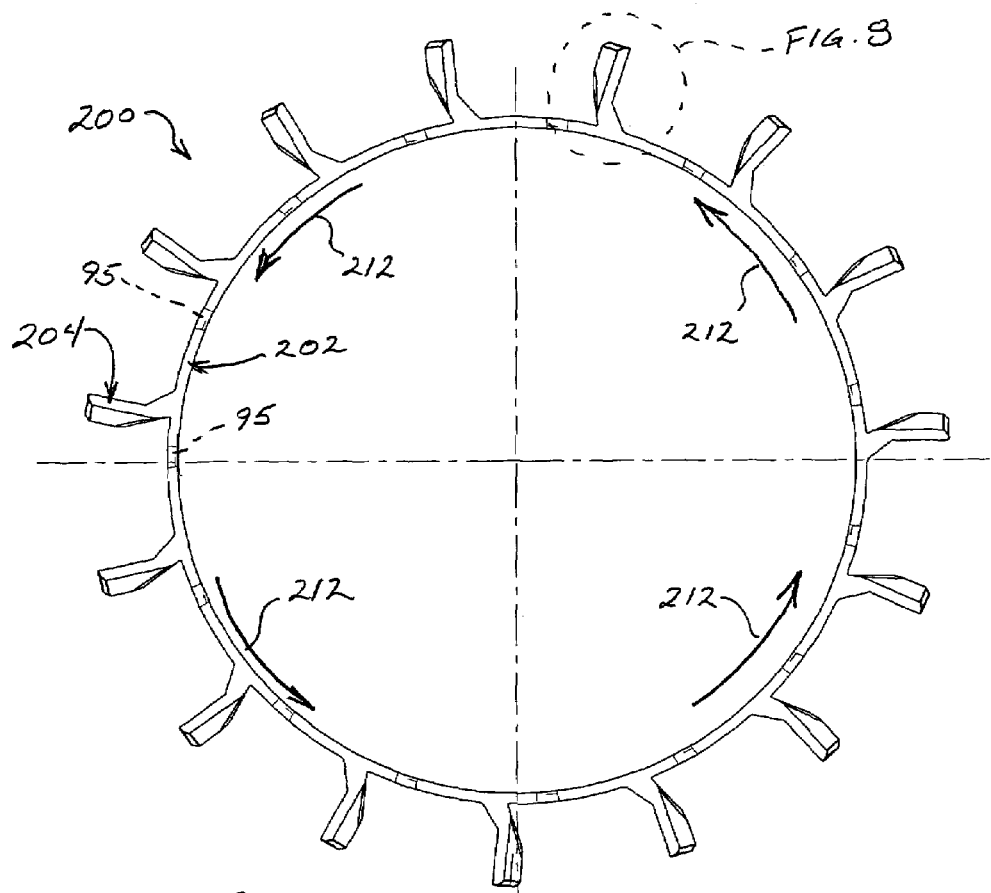
FIG. 7 is a plan view of the preferred embodiment of the seed belt of FIG. 6.
Figure 9:
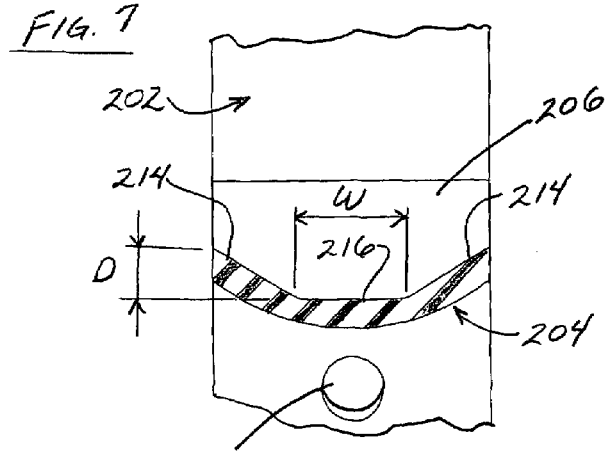
FIG. 9 is a cross-sectional view of the flight of FIG. 8 as viewed along lines 9-9 of FIG. 8.

FIG. 7 is a plan view of the seed belt 200 of FIG. 6. The seed belt 200 comprises a continuous conveyor portion 202 with a plurality of equally spaced flights 204 projecting outwardly therefrom. As best illustrated in FIGS. 6 and 9, the flights 204 are preferably concave or cup-shaped at their distal end, unlike the flat flights 97 of seed belts 96 used in conventional seed belt housings 34 (see FIGS. 3) or the flights 136 of belt 102 of the seed deliver apparatus 100 as illustrated in FIGS. 4 and 5.

Figure 8:
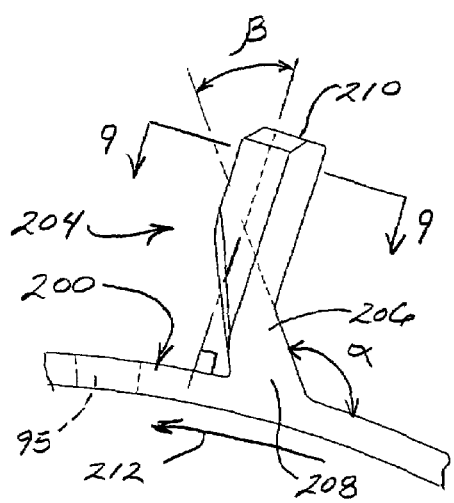
FIG. 8 is a detailed side view of a preferred embodiment of a flight of the seed belt of FIG. 6.

Similar to the flights 97 of the conventional belt 96 (FIG. 3), in the preferred embodiment of the seed belt 200 of the present invention, the leg 206 of the flight 204 preferably slopes at an angle α from the proximal end 208 toward the distal end 210 of the flight 204 in the direction of rotation of the belt 200 as indicated by the arrows 212. Toward the distal end 210 of the flight 204, the leg 206 preferably angles again at an angle β in the opposite direction such that the distal end 210 of the leg 206 of the flight 204 is substantially normal or perpendicular to the conveyor portion 202 as best illustrated in FIG. 8. The purpose of having the distal end 210 of the flight angle back at the angle β is to provide a substantially horizontal surface on which the seed can rest while being conveyed downwardly toward the seed tube. In reference to FIG. 3 in combination with FIG. 6, it should be appreciated that if the distal end of the flight 204 was not angled back relative to the sloping portion of the leg 206, the seed would roll to the tip of the flight and drag along the inside surface of the peripheral wall 82 of the seed belt housing 34 as the belt 200 rotates toward the opening 86 before releasing the seeds into the seed tube.

As described so far, the structure of the flight 204 is substantially the same as the flight 97 of the conventional belt 96. However, unlike the flight 97 of the conventional belt 96 the side edges 214 of the leg 206 at the distal end 210 of the; flight 204 are preferably angled upwardly a distance "D" thereby defining a cup or concave area at the distal end 210. It is preferred that only the outer side edges 214 of the leg 206 are angled upwardly thereby leaving a substantially planar center portion 216 of a width "W." The preferred width "W" of the center portion 216 is preferably greater than or substantially equal to the length of any seeds contemplated to be planted so as to minimize the likelihood of seeds spanning the distance between the angled side edges 214 of the flight 204. It should be appreciated that if the width "W" was shorter than the length of the seeds being planted, or if the flight had a V-shape or a U-shape, some of the longer seeds may span the distance between the side edges 214 while other seeds may not, thereby reducing the distance or increasing the distance, as the case may be, between seeds held in adjacent compartments of the housing 34. This difference in spacing between seeds will translate to a difference in timing, and thus spacing, between the adjacent seeds being released into the seed tube 36.

In the foregoing preferred embodiment, it should be appreciated that any seeds which are received onto the flight 204 will be directed toward the distal end 210 by the sloped surface of the leg 206. Furthermore, the seed will also be directed toward the center portion 216 of the leg 206 by the sloped side edges 214. Thus, the seed will be guided by the cupped flight 204 for release into a more precise area, rather than in the conventional belt 96 wherein the seed may come to rest anywhere along the width of the flight 97 thereby presenting in a much greater area over which the seed may be released, resulting in greater likelihood of seed ricochet if released into a seed tube or less precise placement if the seed is being deposited directly into an open furrow.

It should also be appreciated that if the distal ends 210 of the flights 204 are V-shaped or U-shaped, there is a greater likelihood that some seeds may become lodged or simply get momentarily hang-up in the vertex or bottom of the V or U shaped flights due to more friction or surface contact thereby effecting the release of the seed at the desired time or location. The foregoing concerns are more likely to be experienced when planting larger, flat, ovate seeds, such as corn, sunflowers, and the like, wherein the narrower ends of the ovate seeds are more likely to cause the seed to become lodged or hung-up in the vertex or bottom of V or U-shaped flights.

Although only certain exemplary embodiments of the seed belt of present invention have been described in detail above, those skilled in the art will readily appreciate that many modifications are possible without materially departing from the novel teachings and advantages of this invention. Accordingly, all such modifications are intended to be included within the scope of this invention as defined in the following claims.

The invention claimed is:

1. A seed belt for an agricultural planter, comprising:
    a continuous belt disposed between a seed singulator and an open end of a seed tube of an agricultural planter, said continuous belt receiving seeds from said seed singulator and conveying said received seeds in a direction of travel toward said open end of said seed tube, said seed belt having a plurality of substantially equally spaced flights projecting from an upper surface thereof, each of the flights having a concave portion at a distal end, said distal end of said flights extending downwardly and away from a proximal end of said flights toward said direction of travel so as to urge said received seeds into said concave portion prior to said seeds being released into said open end of said seed tube.

2. The seed belt of claim 1 wherein said proximal end of each of said flights further include a substantially planar portion.

3. The seed belt of claim 2 wherein said distal end further includes an upper surface angled with respect to said substantially planar portion, such that said upper surface of said distal end is substantially normal to said continuous belt upper surface.

4. The seed belt of claim 3 wherein side edges of said distal end of said flight angle upwardly with respect to said distal end upper surface thereby defining said concave portion.

5. The seed belt of claim 4 wherein said concave portion of said distal end includes a central portion disposed between said angled side edges wherein said central portion is substantially planar.

6. The seed belt of claim 5 wherein said substantially planar central portion of said distal end of said flight has a width that is of a dimension at least as large as said received seeds.

7. A seed belt for conveying seeds, the seed belt comprising:
 a continuous belt disposed to receive seeds from a seed singulator of an agricultural planter and for conveying said received seeds in a direction toward, an open end of a seed tube; and
 a plurality of flights extending from said continuous belt, each of said plurality of flights having a substantially concave portion at a distal end thereof for supporting said received seeds, each of said flights further having an angled portion oriented at a downward angle from a proximal end thereof, thus urging said received seeds toward said distal concave portion prior to said received seeds being released into said open end of said seed tube.

8. The seed belt of claim 7 wherein said plurality of flights are substantially equally spaced along said belt.

9. The seed belt of claim 7 wherein said angled portion is substantially planar.

10. The seed belt of claim 7 wherein said concave portion comprises a seed supporting surface which is substantially normal to said belt.

11. The seed belt of claim 10 wherein said seed supporting surface includes a planar bottom section which is normal to said belt, and upwardly extending side portions which are also normal to said belt.

12. The seed belt of claim 11 wherein the upwardly extending sides are also planar and upwardly angled with respect to said planar bottom portion.

13. The seed belt of claim 11 wherein said upwardly extending sides are partially cylindrical and extend from said planar bottom portion.

14. The seed belt of claim 10 said seed supporting surface has a width at least as large as said received seeds.

* * * * *